2 Sheets—Sheet 1.

N. M. BARNES.

HORSE HAY RAKE.

No. 4,232. Reissued Jan. 17, 1871.

Witnesses:

R. J. Stretz

Geo. O. Lemon

Inventor:

Newcomb M. Barnes.

Per

Attorneys.

2 Sheets—Sheet 2.

N. M. BARNES.

HORSE HAY RAKE.

No. 4,232. Reissued Jan. 17, 1871.

Witnesses:

H. J. Stretz

Solon C. Kemon

Inventor:

Newcomb M. Barnes.

PER

Attorneys.

United States Patent Office.

NEWCOMB M. BARNES, OF TIFFIN, OHIO.

Letters Patent No. 105,542, dated July 19, 1870; reissue No. 4,232, dated January 17, 1871.

IMPROVEMENT IN HORSE HAY-RAKES.

The Schedule referred to in these Letters Patent and making part of the same.

*To all whom it may concern*

Be it known that I, NEWCOMB M. BARNES, of Tiffin, in the county of Seneca and State of Ohio, have invented a new and useful Improvement in Horse Hay-Rakes; and I do hereby declare the following to be a full, clear, and exact description of the same, reference being had to the accompanying drawing making a part of this specification, in which—

This invention relates to that class of horse hay-rakes in which the rake proper is supported upon a frame that rests upon the ground, from which frame draw-bars extend forward for the attachment of the team, and handles extend rearward for the operation of the rake.

The invention consists in the combination of handles and frame, arranged to operate as will be hereinafter described.

The invention also consists in the combination, with the handles and frame, of stop-pins, as will be hereinafter described, The invention also consists in certain other particulars, which are hereinafter fully set forth.

The main frame of my rake is composed of draw-bars A A, upright posts B B′, and shoes or runners E E.

The draw-bars A A are held the proper distance apart by a girt, K, and are supported at their rear ends by four upright standards B B′.

The first, on each side, of these standards sits just in the rear of the revolving rake-head D.

The standards are supported at the bottom by two shoes or runners E E, one on each side of the frame, and on the front ends of said shoes rests and revolves the rake-head D, which is held firmly down by a cap, *a*, made of metal or other suitable material, and bolted fast to the front standard B.

Inside of this main frame are two arms F F, pivoted at their lower ends to the front posts B B, immediately in rear of and just above the head D.

These arms extend backward and are connected in the middle by a girt, G, and at the rear ends by a handle, H, whereby they are held rigidly, the handle being also made use of to operate the arms F F.

Figure 1:
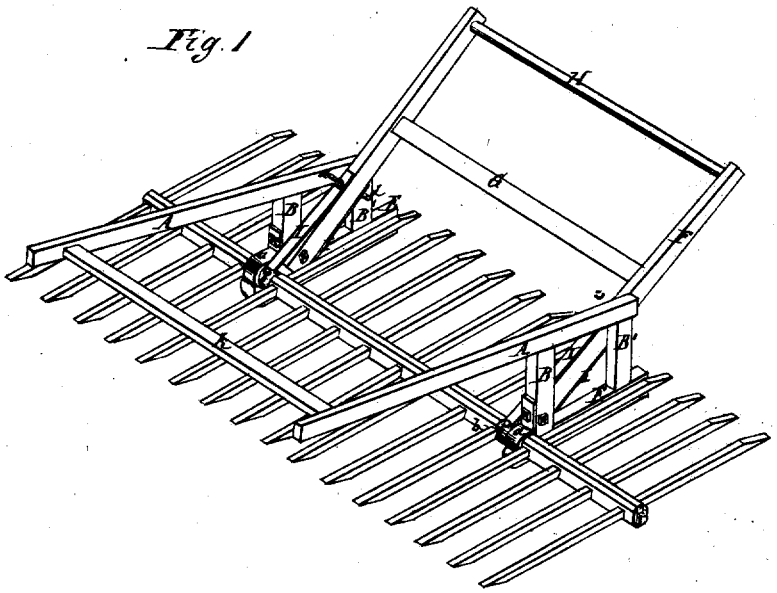
Figure 1 is a view in perspective.
Figure 2:
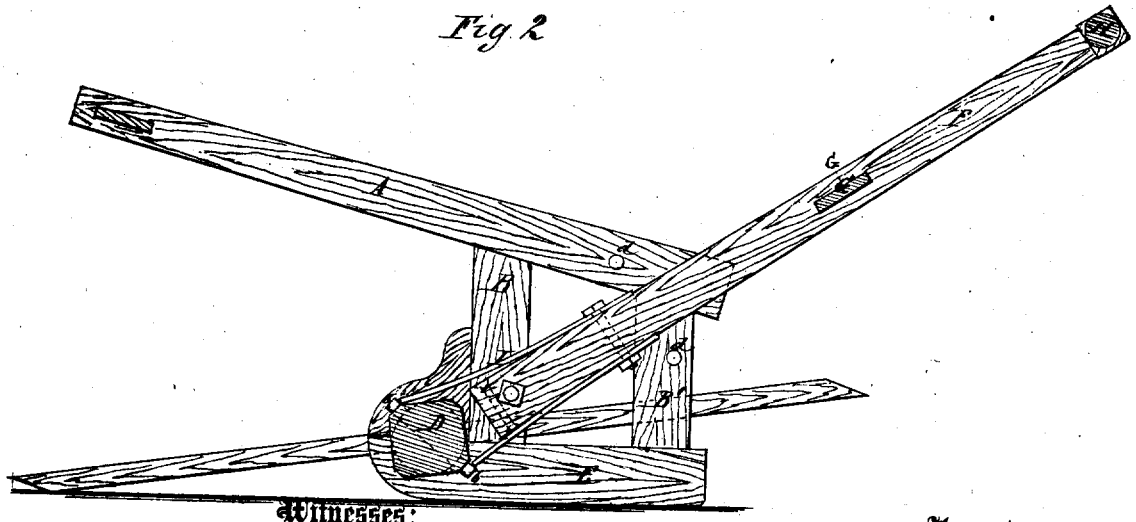
Figure 2 is a sectional elevation, showing the frame and front ends of the rake-teeth resting on the ground.

The arm-frame F G H is provided with four springs I I, made of metal or other suitable material, attached respectively to the upper and under sides of said arms, at the lower ends of the same, and resting against lugs *b* on the head D, in such a manner that, by raising the handle H, the springs on the upper sides of the arms will operate on the lugs on the upper side of the head, rotating the head forward and depressing the teeth on front part of head to any desired position without revolving the rake, as shown in fig. 2.

Figure 4:
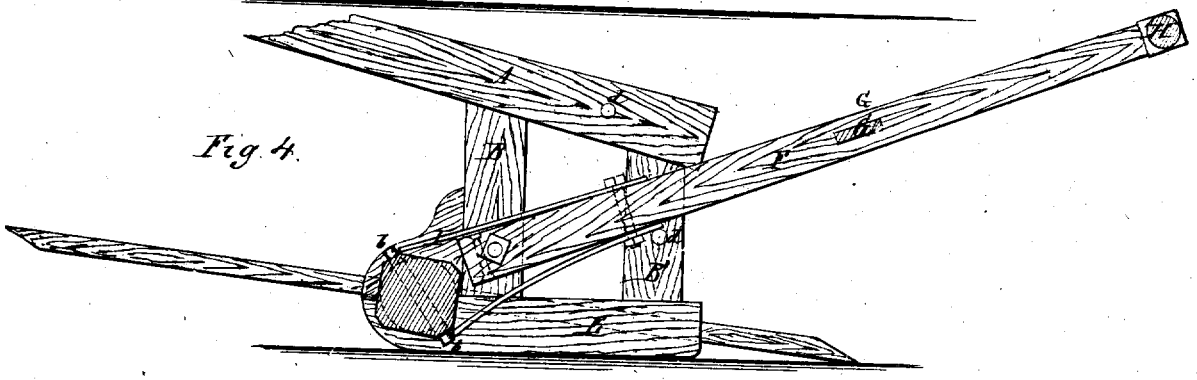
Figure 4 is a sectional elevation, showing the frame and rear ends of the teeth resting on the ground.

By reversing this motion, bearing down on the handle H, the springs on the lower sides of the arms will operate against lugs *b* on the under side of the head, and cause the head to rotate backward, throwing the front teeth upward so as to ride over obstructions, as shown in fig. 4.

The pins *b* pass through the rake-head at an angle with the rake-teeth, so as to present themselves squarely to the ends of the springs I.

When it is desired to evolve the rake, raise the handle H until the front teeth enter the ground, whereupon the springs on the lower sides of the arms relieve themselves from the lugs on the lower side of the head and allow the head to revolve, when both the springs on the upper and lower sides of each arm assume their original position and hold the rake-head firmly until the rake is to be revolved again.

On the main frame are placed four pins *d d*, two on each side, one above and one below each arm F, which pins prevent the arms from moving too far, so as to put undue strain on the springs.

Figure 3:
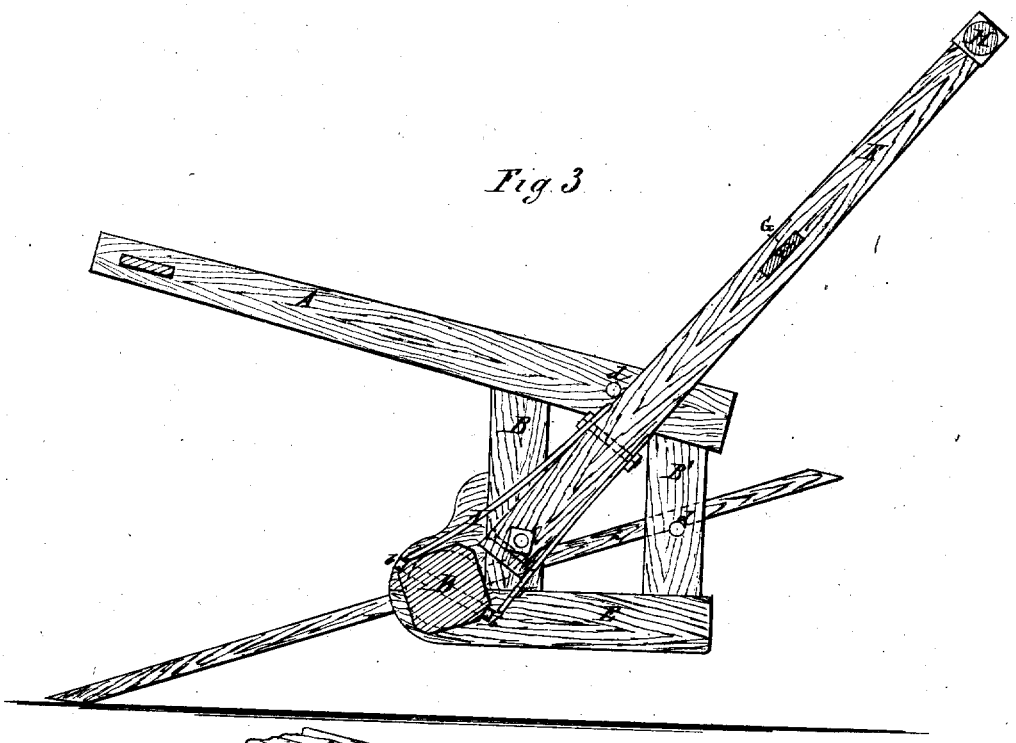
Figure 3 is a sectional elevation, showing the frame raised from the ground, and the rake-head in the act of revolving.

The upper pair of pins, *d*, discharges the additional function of a stop, against which, when the arms F are pressed, the whole frame is elevated, as shown in fig. 3, far enough to admit of the revolution of the rake-head.

Having thus described my invention,

What I claim as new, and desire to secure by Letters Patent, is—

1. The handles F F when pivoted to the frame A B E, substantially as shown and described, and provided with springs I to operate upon the rake-head, as and for the purpose specified.

2. In combination with the above the stop-pins *d d*, substantially as shown and described, for the purpose specified.

3. The head D of a revolving rake, mounted on a frame, composed of the draw-bars A A, upright posts B B, and shoes or runners E E, the several parts being constructed and arranged substantially as specified.

NEWCOMB M. BARNES.

Witnesses:
SOLON C. KEMON,
THOS. D. D. OURAND.